United States Patent
Preiss et al.

(10) Patent No.: US 10,807,656 B2
(45) Date of Patent: Oct. 20, 2020

(54) AIR DIRECTING APPARATUS FOR A MOTOR VEHICLE

(71) Applicant: Dr. Ing. h.c. F. Porsche Aktiengesellschaft, Stuttgart (DE)

(72) Inventors: Michael Preiss, Vaihingen (DE); Matthias Braun, Vaihingen an der Enz (DE); Benjamin Bernard, Karlsruhe (DE)

(73) Assignee: Dr. Ing. h.c F. Porsche Aktiengesellschaft, Stuttgart (DE)

( * ) Notice: Subject to any disclaimer, the term of this patent is extended or adjusted under 35 U.S.C. 154(b) by 37 days.

(21) Appl. No.: 16/215,668

(22) Filed: Dec. 11, 2018

(65) Prior Publication Data
US 2019/0176910 A1  Jun. 13, 2019

(30) Foreign Application Priority Data
Dec. 13, 2017  (DE) .......................... 10 2017 129 746

(51) Int. Cl.
*B62D 35/00*  (2006.01)
(52) U.S. Cl.
CPC ........... *B62D 35/007* (2013.01); *B62D 35/00* (2013.01)
(58) Field of Classification Search
CPC .... B62D 35/00; B62D 35/005; B62D 35/007; B62D 35/02

USPC ............................................ 296/180.1, 180.2
See application file for complete search history.

(56) References Cited

U.S. PATENT DOCUMENTS

| | | | | |
|---|---|---|---|---|
| 2,800,291 A | * | 7/1957 | Stephens | B64C 23/06 244/200 |
| 4,284,302 A | * | 8/1981 | Drews | B62D 35/00 152/523 |
| 5,598,990 A | * | 2/1997 | Farokhi | B64C 23/06 244/198 |
| 2011/0109121 A1 | * | 5/2011 | Salari | B62D 35/001 296/180.2 |
| 2011/0175395 A1 | * | 7/2011 | Guigne | B62D 35/001 296/180.3 |

FOREIGN PATENT DOCUMENTS

| | | |
|---|---|---|
| DE | 10028178 A1 | 12/2001 |
| EP | 0273850 B1 | 9/1991 |
| JP | 5303598 B2 | 10/2013 |

* cited by examiner

*Primary Examiner* — Jason S Daniels
(74) *Attorney, Agent, or Firm* — Leydig, Voit & Mayer, Ltd.

(57) ABSTRACT

An air directing apparatus for a motor vehicle includes a basic body configured to direct an air flow occurring during operation of the motor vehicle as intended. The basic body has a height that changes continuously in a transverse direction of the motor vehicle.

8 Claims, 3 Drawing Sheets

AIR DIRECTING APPARATUS FOR A MOTOR VEHICLE

CROSS REFERENCE TO RELATED APPLICATIONS

This application claims benefit to German Patent Application No. DE 10 2017 129 746.4, filed Dec. 13, 2017, which is hereby incorporated by reference herein.

FIELD

The invention relates to an air-directing apparatus for a motor vehicle having a basic body designed to direct an air flow occurring during operation of the motor vehicle.

BACKGROUND

Air-directing apparatuses are known from the prior art as wings or spoilers. JP 5303598 B2 discloses a spoiler in the rear region of a motor vehicle with a concave profile. In addition, the height of the spoiler changes in the transverse direction of the motor vehicle.

Spoilers or wings may be a source of noise which is dependent on the travel speed. The reason for this is a regularly pulsating flow separation which can be formed at the spoiler or wing. Vortices frequently arise at the rear edge of the spoiler or of the wing. By interaction with the vehicle structure, the noises arising here are transmitted into the passenger cell of the motor vehicle.

Different measures for reducing said disturbing noises are known from the prior art. DE 100 28 178 A1 and EP 0 273 850 B1 disclose swirling elements in the form of a plurality of nozzle-like ducts. It is additionally known to change the height of the spoiler over its length. The options already known for reducing the noises are subject to limits on account of production capability, design and legislation.

SUMMARY

In an embodiment, the present invention provides an air directing apparatus for a motor vehicle. The air directing apparatus includes a basic body attachable to the motor vehicle and configured to direct an air flow occurring during operation of the motor vehicle as intended. The basic body has a height that changes continuously in a transverse direction of the motor vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
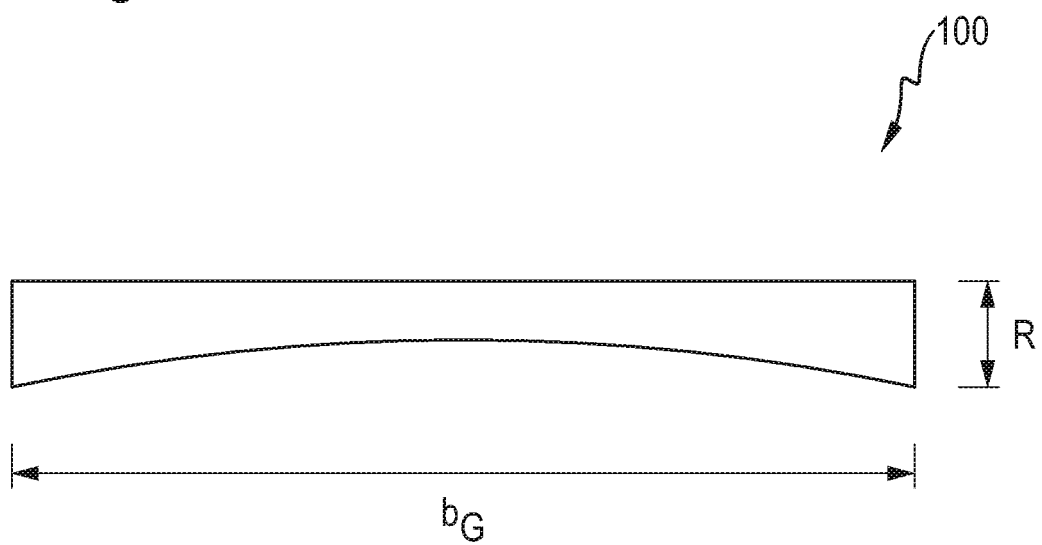
FIG. 1 shows a schematic front view of a basic body with a height changing continuously in a transverse direction of a motor vehicle.

Embodiments of the present invention provide further options for reducing disturbing noises that occur at air-directing apparatuses during operation of a motor vehicle.

Embodiments of the invention provide air-directing apparatuses that have a basic body which is designed to direct an air flow occurring during use of the motor vehicle as intended. Operation of the motor vehicle as intended is understood here within the scope of this description as meaning in particular travel in the forward direction of the motor vehicle.

When the device is fastened to the motor vehicle, the basic body has a height which changes continuously in the transverse direction of the motor vehicle. The height of the basic body is understood here within the scope of this description as meaning the dimension of the basic body in the vertical direction of the motor vehicle.

This design of the basic body reduces or avoids the regularity of the flow separation at the basic body, as a result of which disturbing noises arise to a lesser extent.

According to one embodiment of the invention, an air-directing apparatus can comprise swirling elements which are preferably arranged on the basic body. Said swirling elements can be designed to cause swirling in the air flow directed by the basic body. When the device is fastened to the motor vehicle, the swirling elements can be arranged spaced apart from one another in the transverse direction of the motor vehicle. Intermediate spaces are arranged between the swirling elements and expand or narrow downstream in the inflow direction of the air flow. During use of the motor vehicle as intended, the inflow direction runs along the longitudinal axis of the motor vehicle in the direction of the rear of the motor vehicle.

The expansion of the intermediate spaces is understood within the scope of this description as meaning in particular that the intermediate spaces become larger in the transverse direction of the motor vehicle. The narrowing of the intermediate spaces is understood within the scope of this description as meaning in particular that the intermediate spaces become smaller in the transverse direction of the motor vehicle.

The swirling elements with the expanding intermediate spaces are particularly effective since, as viewed in the direction of flow of the air flow, a flow separation is generated at the side edges of the intermediate spaces at the start of the intermediate spaces, and therefore an additional negative pressure is generated by boundary vortices in each of the intermediate spaces. The air flows are escorted through the intermediate spaces by the boundary vortices. The boundary vortices therefore have a disturbing influence on the regularly pulsating flow separation at the basic body, as a result of which disturbing noises are reduced.

The swirling elements with the narrowing intermediate spaces are particularly effective since the flow through the narrowing intermediate spaces is locally accelerated, and therefore a more rapid air jet than the outflow which is normal in the regions is present behind said intermediate spaces. Said disturbing flow has a disturbing influence on the regularly pulsating flow separation at the basic body, and therefore disturbing noises are reduced.

It is particularly advantageous if the swirling elements are arranged on the basic body in a region in which the basic body has a relatively low height change gradient in longitudinal section.

According to one embodiment of the invention, the swirling elements can be arranged in a rear region of the basic body when an air-directing apparatus is fastened to the motor vehicle. The rear region here can be in particular the rear half of the basic body in the travel direction of the motor vehicle. In particular, it is advantageous if the rear region comprises only the rear third or the rear quarter of the basic body. This further reduces the disturbing noises since the regularly pulsating flow separation at the basic body is more effectively disturbed.

According to one embodiment of the invention, the swirling elements can be arranged on a surface of an air-directing apparatus that is directed upward when the air-directing apparatus is fastened to the motor vehicle.

According to one embodiment of the invention, the swirling elements can be arranged on a surface of an air-directing apparatus that is directed downward when the air-directing apparatus is fastened to the motor vehicle. This arrangement is advantageous in particular for visual reasons since said surface is customarily less readily visible.

According to one embodiment of the invention, the intermediate spaces can expand continuously in a first region and can have a constant width in a second region. The second region is arranged here downstream of the first region in the inflow direction of the air flow. A particularly good effect of the intermediate spaces is thereby achieved in order to reduce the disturbing noises. The first region preferably extends over more than half of the length of the swirling elements.

It is also possible for the first region to comprise two partial regions. The intermediate spaces in the first partial region can expand to a lesser extent than in the second partial region. The extent of the expansion is understood here within the scope of this description as meaning in particular the expansion of the intermediate spaces per unit of length.

According to one embodiment of the invention, the swirling elements can each have a height which is at least one quarter of the height of the basic body. Tests have shown that this is particularly advantageous in order to reduce undesirable disturbing noises.

According to one embodiment of the invention, the swirling elements can each have a length which is 1.5 times to 2.5 times the height of the basic body. Tests have shown that this is particularly advantageous in order to reduce undesirable disturbing noises. When the device is fastened to the motor vehicle, the length is understood here as meaning the extent of the swirling elements in the longitudinal direction of the motor vehicle.

According to one embodiment of the invention, the intermediate spaces can expand from a width of between one fifth and one third of the height of the basic body to a width of between 1.5 times and double the height of the basic body. Tests have shown that this is particularly advantageous in order to reduce undesirable disturbing noises.

According to one embodiment of the invention, the swirling elements can each have a width of between 1.5 times and 2.5 times the height of the basic body. Tests have shown that this is particularly advantageous in order to reduce undesirable disturbing noises.

According to one embodiment of the invention, the swirling elements can have different distances from one another, different heights, different lengths and/or different widths. Tests have shown that this is particularly advantageous in order to reduce undesirable disturbing noises.

An air-directing apparatus can be designed to direct the air flow in such a manner that a downwardly directed force acts on the air-directing apparatus. This force can improve the driving performance of the motor vehicle, in particular during cornering.

According to an embodiment, a motor vehicle is provided having an air-directing apparatus in which swirling elements are arranged in a projection region on the motor vehicle outside the basic body of the wing or spoiler. Said projection region is defined by a vertical geometrical projection of swirling elements onto a body of the motor vehicle.

The basic body 100 illustrated in FIG. 1 has a height R changing over its width $b_G$. The width $b_G$ here is the dimension which extends in the transverse direction of the motor vehicle in the state fastened to the motor vehicle. The height R changes continuously over the entire width $b_G$. The basic body 100 here has the smallest height R in the center and the greatest height R at its outer ends. This shape has proven particularly advantageous in tests in order to reduce disturbing noises.

Figure 2:
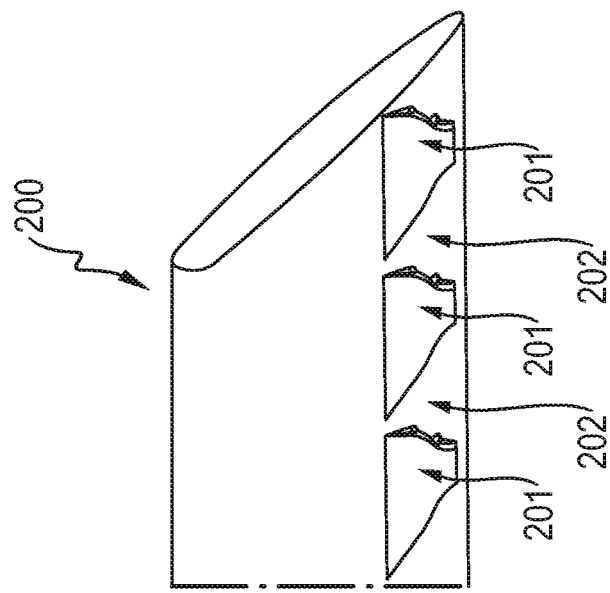
FIG. 2 shows a schematic perspective view of a lower side of a basic body with swirling elements arranged thereon.
Figure 3:
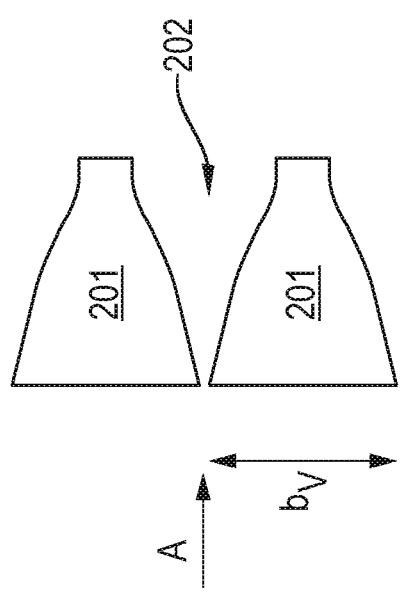
FIG. 3 shows a schematic top view of the swirling elements from FIG. 2.
Figure 4:
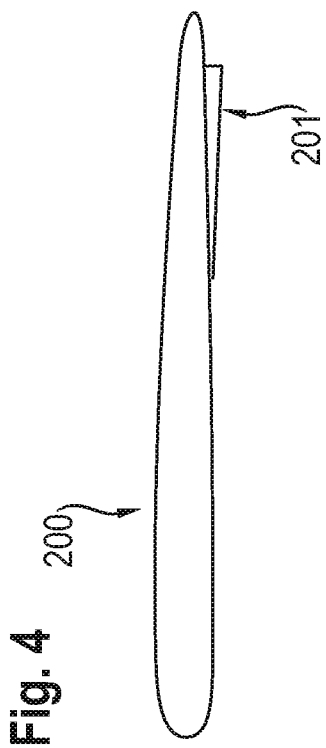
FIG. 4 shows a schematic side view of the basic body from FIG. 2.

The basic body 200 illustrated in FIGS. 2 to 4 has swirling elements 201 on its lower side with intermediate spaces 202 arranged in between. The intermediate spaces 202 are arranged between the swirling elements 201 in the transverse direction of the motor vehicle.

In the inflow direction A of the air flow occurring during operation of the motor vehicle as intended, the swirling elements 201 have a tapering shape in their width by. The intermediate spaces 202 between the swirling elements 201 therefore expand downstream in the inflow direction A.

By way of such swirling elements 201 and intermediate spaces 202, flow separations arise downstream in the inflow direction A at the side edges of the intermediate spaces 202 at the beginning of the intermediate spaces 202, and therefore an additional negative pressure is generated by boundary vortices in each of the intermediate spaces 202. The air flow is escorted through the intermediate spaces 202 by the boundary vortices. The boundary vortices have a disturbing influence on the regularly pulsating flow separation at the basic body 200, as a result of which disturbing noises are reduced.

The width by of the swirling elements 201 and of the intermediate spaces 202 changes continuously in a first region which is at the front in the state fastened to the motor vehicle. The width by of the swirling elements 201 and of the intermediate spaces 202 remains constant in a second region at the rear in the state fastened to the motor vehicle.

In the first region, the reduction in the width by of the swirling elements 201 in the inflow direction A is greater in a first partial region than in an adjoining second partial region. The first partial region here comprises the front end of the swirling elements 201. The second partial region adjoins the first partial region. The second region adjoins the second partial region.

The shape of the swirling elements 201 that is illustrated in FIGS. 2 to 4 has proven particularly readily suitable in tests in order to reduce disturbing noises in the motor vehicle. It is advantageous in particular if the swirling elements 201 are combined with the change in height of the basic body 100 that is illustrated in FIG. 1.

Figure 5:
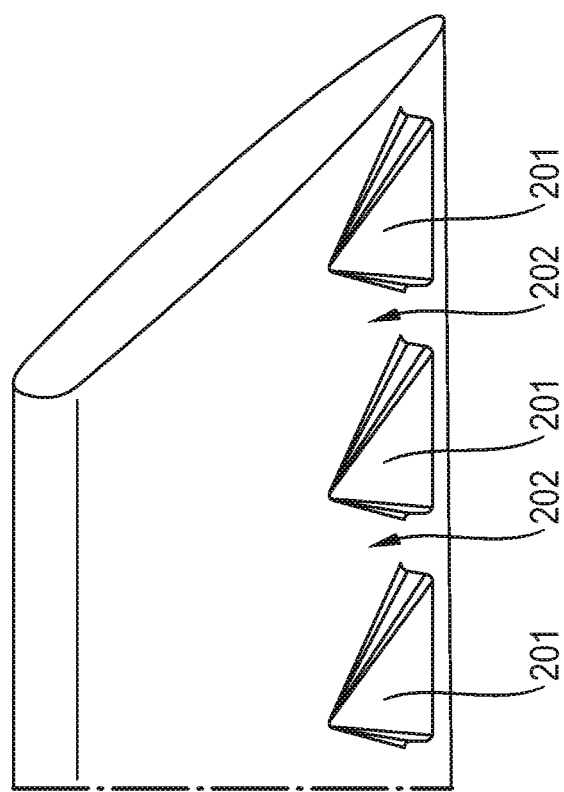
FIG. 5 shows a schematic perspective view of a lower side of a basic body with swirling elements arranged thereon.
Figure 6:
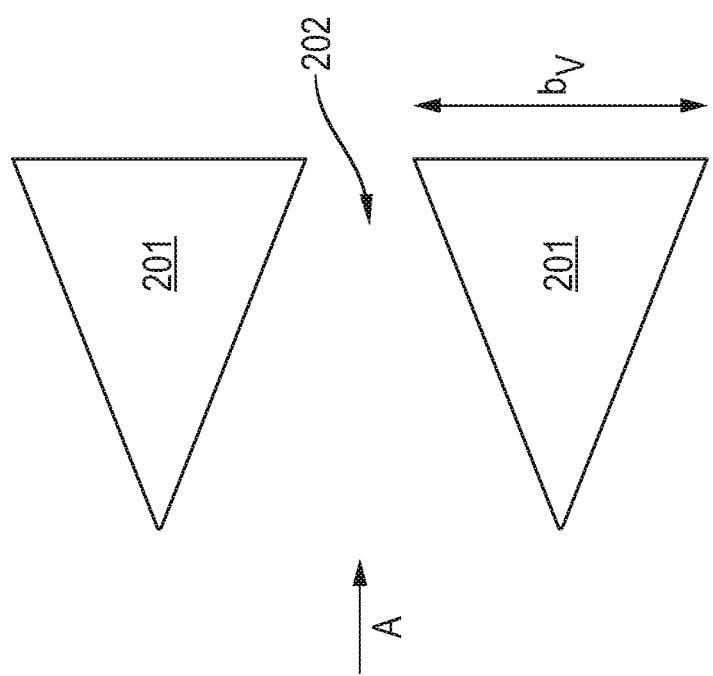
FIG. 6 shows a schematic top view of the swirling elements from FIG. 5.

A further embodiment of the swirling elements 201 is illustrated in FIGS. 5 and 6. Said swirling elements, as illustrated in FIG. 4, can also be arranged on the lower side of the basic body 200.

The swirling elements 201 from FIGS. 5 and 6 essentially differ from those from FIGS. 2 to 4 in that the intermediate space 202 between the swirling elements 201 narrows in the inflow direction A. By way of such swirling elements 201 and intermediate spaces 202, the flow is locally accelerated, and therefore, behind said intermediate spaces 202, there is a more rapid air jet than the outflow which is normal in the regions. Said disturbing flows have a disturbing influence on the regularly pulsating flow separation at the basic body 200, as a result of which disturbing noises are reduced. This shape has proven particularly advantageous in tests for reducing the disturbing noises in the motor vehicle. It is advantageous in particular if the swirling elements 201 are combined with the change in the height of the basic body 100 that is illustrated in FIG. 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An air-directing apparatus for a motor vehicle, comprising:
    a basic body attachable to the motor vehicle and configured to direct an air flow occurring during operation of the motor vehicle as intended,
    wherein the basic body has a height that changes continuously in a transverse direction of the motor vehicle,
    wherein the air-directing apparatus comprises swirling elements arranged on the basic body and configured to cause swirling in the air flow,
    wherein the swirling elements are spaced apart from one another in the transverse direction of the motor vehicle such that intermediate spaces are arranged between the swirling elements,
    wherein the intermediate spaces expand or narrow downstream in an inflow direction of the air flow
    wherein the intermediate spaces expand from a width of between one fifth and one third of the height of the basic body to a width of between 1.5 times and double the height of the basic body, or wherein the intermediate spaces narrow from a width of between 1.9 times and 2.3 times the height of the basic body to a width of between one third and one fifth of the height of the basic body.

2. The air-directing apparatus as claimed in claim 1, wherein the swirling elements are arranged in a rear region of the basic body.

3. The air-directing apparatus as claimed in claim 1, wherein the swirling elements are arranged on a surface of the air-directing apparatus that is directed downward or upward direction of the motor vehicle.

4. The air-directing apparatus as claimed in claim 1, wherein the swirling elements each have a height which is at least one quarter of the height of the basic body, and/or wherein the swirling elements each have a length which is 1.5 times to 2.5 times the height of the basic body.

5. The air-directing apparatus as claimed in claim 1, wherein the swirling elements each have a width of between 1.5 times and 2.5 times the height of the basic body.

6. The air-directing apparatus as claimed in claim 1, wherein the swirling elements are arranged at different distances from one another, and/or wherein the swirling elements have different widths, heights and/or lengths.

7. A motor vehicle, comprising the air-directing apparatus as claimed in claim 1, wherein the swirling elements are arranged in a projection region on the motor vehicle outside the basic body of a wing or a spoiler, wherein the projection region is defined by a vertical geometrical projection of swirling elements onto a body of the motor vehicle.

8. An air-directing apparatus for a motor vehicle, comprising:
    a basic body attachable to the motor vehicle and configured to direct an air flow occurring during operation of the motor vehicle as intended,
    wherein the basic body has a height that changes continuously in a transverse direction of the motor vehicle,
    wherein the air-directing apparatus comprises swirling elements arranged on the basic body and configured to cause swirling in the air flow,
    wherein the swirling elements are spaced apart from one another in the transverse direction of the motor vehicle such that intermediate spaces are arranged between the swirling elements,
    wherein the intermediate spaces expand downstream in an inflow direction of the air flow
    wherein the intermediate spaces expand continuously in a first region and have a constant width in a second region, and
    wherein the second region is arranged downstream of the first region in the inflow direction of the air flow.

\* \* \* \* \*